US 9,353,518 B2

(12) United States Patent
Mathur et al.

(10) Patent No.: US 9,353,518 B2
(45) Date of Patent: May 31, 2016

(54) NOISE REDUCTION SYSTEM FOR COMPOSITE STRUCTURES

(71) Applicant: The Boeing Company, Chicago, IL (US)

(72) Inventors: Gopal Prasad Mathur, Trabuco Canyon, CA (US); Cliff L. Chin, Fullerton, CA (US)

(73) Assignee: THE BOEING COMPANY, Chicago, IL (US)

( * ) Notice: Subject to any disclaimer, the term of this patent is extended or adjusted under 35 U.S.C. 154(b) by 43 days.

(21) Appl. No.: 14/312,688

(22) Filed: Jun. 24, 2014

(65) Prior Publication Data

US 2014/0299409 A1    Oct. 9, 2014

Related U.S. Application Data

(62) Division of application No. 13/303,294, filed on Nov. 23, 2011, now Pat. No. 8,770,343.

(51) Int. Cl.
*E04B 1/82* (2006.01)
*E04B 1/84* (2006.01)
*E04B 1/86* (2006.01)
*B32B 3/12* (2006.01)
*G10K 11/172* (2006.01)
(Continued)

(52) U.S. Cl.
CPC ... *E04B 1/82* (2013.01); *B32B 3/12* (2013.01); *B64C 1/066* (2013.01); *B64C 1/40* (2013.01); *E04B 1/86* (2013.01); *G10K 11/172* (2013.01); *Y02T 50/46* (2013.01); *Y10T 428/24149* (2015.01)

(58) Field of Classification Search
CPC ............... B32B 3/12; E04B 1/82; E04B 1/86; G10K 11/172; B64F 1/26
USPC .......... 181/290, 292, 210, 288, 294; 244/1 N; 428/116
See application file for complete search history.

(56) References Cited

U.S. PATENT DOCUMENTS 3,078,948 A * 2/1963 Lemmerman ............. E04B 1/86
181/292
4,111,081 A * 9/1978 Hilliard ................ G10K 11/168
181/210

(Continued)

FOREIGN PATENT DOCUMENTS

FR            2929746 A1    10/2009

OTHER PUBLICATIONS

Backstrom et al., "Modelling the vibration of sandwich beams using frequency-dependent parameters," Journal of Sound and Vibration, vol. 300, Issues 3-5, Mar. 2007, pp. 589-611.

(Continued)

*Primary Examiner* — David Warren
*Assistant Examiner* — Christina Schreiber
(74) *Attorney, Agent, or Firm* — Yee & Associates, P.C.

(57) ABSTRACT

A method and apparatus comprising a composite panel and a number of structures to reduce noise radiation from the composite panel. The composite panel has a first face sheet, a second face sheet, and a core located between the first face sheet and the second face sheet. The number of structures is associated with the first face sheet. The number of structures has a mass with a configuration to reduce a speed of waves propagating in the composite panel such that noise radiating from the composite panel is reduced.

19 Claims, 16 Drawing Sheets

(51) Int. Cl.
*B64C 1/06* (2006.01)
*B64C 1/40* (2006.01)

(56) References Cited

U.S. PATENT DOCUMENTS

| | | | | |
|---|---|---|---|---|
| 4,241,806 A * | 12/1980 | Metzger | E04B 1/86 | 181/284 |
| 4,450,465 A * | 5/1984 | Pimbley | H01L 31/022408 | 257/291 |
| 4,838,524 A * | 6/1989 | McKeown | E01F 8/0011 | 181/210 |
| 5,289,878 A * | 3/1994 | Landi | B29C 65/028 | 168/12 |
| 5,756,182 A * | 5/1998 | Landi | B29C 65/028 | 156/197 |
| 6,174,587 B1 * | 1/2001 | Figge, Sr. | B32B 5/18 | 181/290 |
| 6,220,388 B1 * | 4/2001 | Sanborn | E04B 1/86 | 181/290 |
| 6,569,509 B1 * | 5/2003 | Alts | B32B 3/20 | 181/284 |
| 7,419,031 B2 * | 9/2008 | Liguore | B32B 3/12 | 181/210 |
| 7,913,813 B1 * | 3/2011 | Mathur | G10K 11/172 | 181/290 |
| 8,087,494 B2 | 1/2012 | Palumbo et al. | | |
| 8,127,889 B1 * | 3/2012 | Mathur | B64C 1/40 | 181/290 |
| 8,292,214 B2 | 10/2012 | Lin et al. | | |
| 8,770,343 B2 * | 7/2014 | Mathur | B64C 1/066 | 181/210 |
| 2005/0194210 A1 * | 9/2005 | Panossian | B32B 3/12 | 181/293 |
| 2006/0208135 A1 * | 9/2006 | Liguore | B29C 70/088 | 244/117 R |
| 2006/0272279 A1 * | 12/2006 | Palumbo | B60R 13/08 | 52/783.1 |
| 2008/0128202 A1 * | 6/2008 | Palumbo | B32B 3/12 | 181/292 |
| 2009/0107059 A1 * | 4/2009 | Kipp | C04B 28/26 | 52/144 |
| 2009/0173571 A1 * | 7/2009 | Keller | B64C 1/40 | 181/292 |
| 2009/0184200 A1 | 7/2009 | Lin et al. | | |
| 2011/0041310 A1 * | 2/2011 | Palumbo | B60R 13/08 | 29/428 |
| 2011/0248117 A1 | 10/2011 | Boock et al. | | |
| 2012/0064285 A1 * | 3/2012 | Mathur | B32B 3/12 | 428/116 |
| 2012/0308768 A1 * | 12/2012 | Mishra | B29C 44/0415 | 428/116 |
| 2013/0126267 A1 * | 5/2013 | Mathur | B64C 1/066 | 181/284 |
| 2014/0262603 A1 * | 9/2014 | Johnson | E04B 1/86 | 181/211 |
| 2014/0299409 A1 * | 10/2014 | Mathur | B64C 14/066 | 181/290 |
| 2015/0030806 A1 * | 1/2015 | Fink | B32B 3/12 | 428/116 |

OTHER PUBLICATIONS

Balmes et al., "Validation of a vibration and electric model of honeycomb panels equiped with piezoelectric patch actuators," Revue des composites et des materiaux avancés, vol. 19, No. 3, Apr. 2009, 21 pages.

Dawood et al., "Two-way bending behavior of 3-D GFRP sandwich panels with through-thickness fiber instertions" Composite Structures, vol. 92, No. 4, Mar. 2010, pp. 950-963.

Extended European Search Report, dated Apr. 24, 2013, regarding Application No. EP12193430.1, 7 pages.

Oskooei, "A Higher Order Finite Element for Sandwich Plate Analysis," Masters Thesis, Graduate Department of Aerospace Science and Engineering, University of Toronto, 1998, 108 pages.

"Office Action, dated May 23, 2014, regarding U.S. Appl. No. 13/303,294, 11 pages".

Final Office Action, dated Dec. 6, 2014, regarding U.S. Appl. No. 13/303,294, 10 pages.

Notice of Allowance, dated Feb. 28, 2014, regarding U.S. Appl. No. 13/303,294, 10 pages.

* cited by examiner

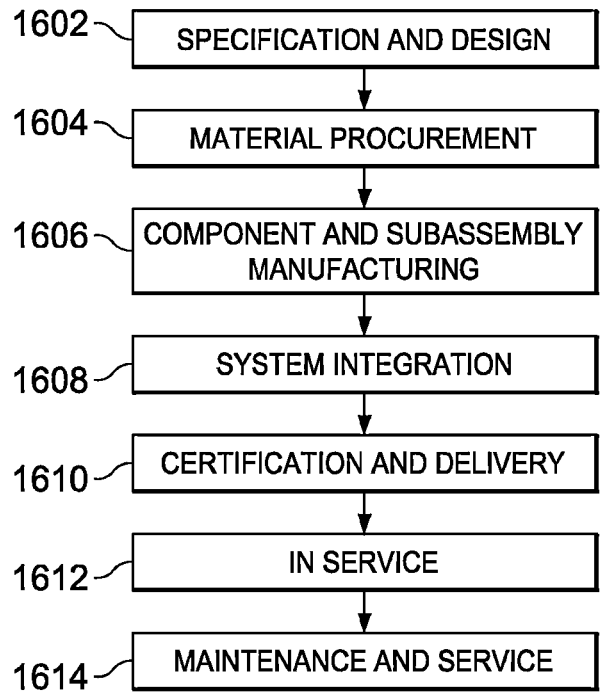
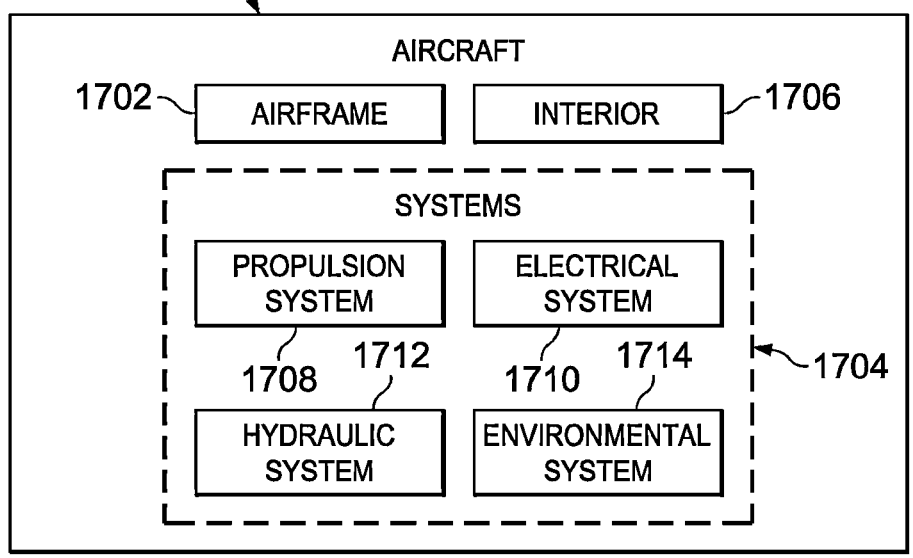

NOISE REDUCTION SYSTEM FOR COMPOSITE STRUCTURES

This application is a divisional of U.S. patent application Ser. No. 13/303,294, filed Nov. 23, 2011, the entire contents of which are incorporated herein by reference.

BACKGROUND INFORMATION

1. Field

The present disclosure relates generally to aircraft structures and, in particular, to aircraft using composite structures. Still more particularly, the present disclosure relates to a method and apparatus for reducing noise in composite structures in an aircraft.

2. Background

Aircraft are being designed and manufactured with greater and greater percentages of composite materials. For example, some aircraft may have more than 50 percent of their primary structures made from composite materials. Further, composite materials also may be used in the interior of the aircraft and for other structures.

Composite materials are used in aircraft to decrease the weight of the aircraft. With the decreased weight, improved payload capacities and fuel efficiencies may occur. Further, composite materials also may provide a longer service life for various components in an aircraft.

Composite materials have a lighter weight and greater stiffness as compared to metallic structures. As a result, composite materials also are more efficient in radiating noise as compared to metallic materials. With the use of composite materials in place of metallic materials, noise in the interior of an aircraft may be greater than desired.

Currently, noise is controlled using different types of noise reduction systems. For example, dampening systems, fiberglass blankets, acoustic foam, isolators, and other systems may be used to reduce the noise generated by composite structures. These noise reduction systems, however, may be labor intensive for installation and may require additional space. Further, these types of systems also may be more expensive and add more weight than desired. Further, even with these noise reduction systems in place, the amount of noise reduction achieved may not be as great as desired.

Therefore, it would be desirable to have a method and apparatus that takes into account at least some of the issues discussed above as well as possibly other issues.

SUMMARY

In one illustrative embodiment, an apparatus comprises a composite panel and a number of structures. The composite panel has a first face sheet, a second face sheet, and a core located between the first face sheet and the second face sheet. The number of structures is associated with the first face sheet. The number of structures has a mass with a configuration to reduce a speed of waves propagating in the composite panel such that noise radiating from the composite panel is reduced.

In another illustrative embodiment, a method for reducing noise is present. The method causes waves to propagate through a composite panel comprising a first face sheet, a second face sheet, and a core located between the first face sheet and the second face sheet. A speed of waves propagating through the composite panel is reduced with a number of structures associated with the first face sheet. The number of structures has a mass with a configuration to reduce the speed of the waves propagating in the composite panel such that noise radiating from the composite panel is reduced.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives thereof will best be understood by reference to the following detailed description of an illustrative embodiment of the present disclosure when read in conjunction with the accompanying drawings, wherein:

FIG. 16 is an illustration of an aircraft manufacturing and service method in accordance with an illustrative embodiment; and FIG. 17 is an illustration of an aircraft in which an illustrative embodiment may be implemented.

DETAILED DESCRIPTION

Figure 1:
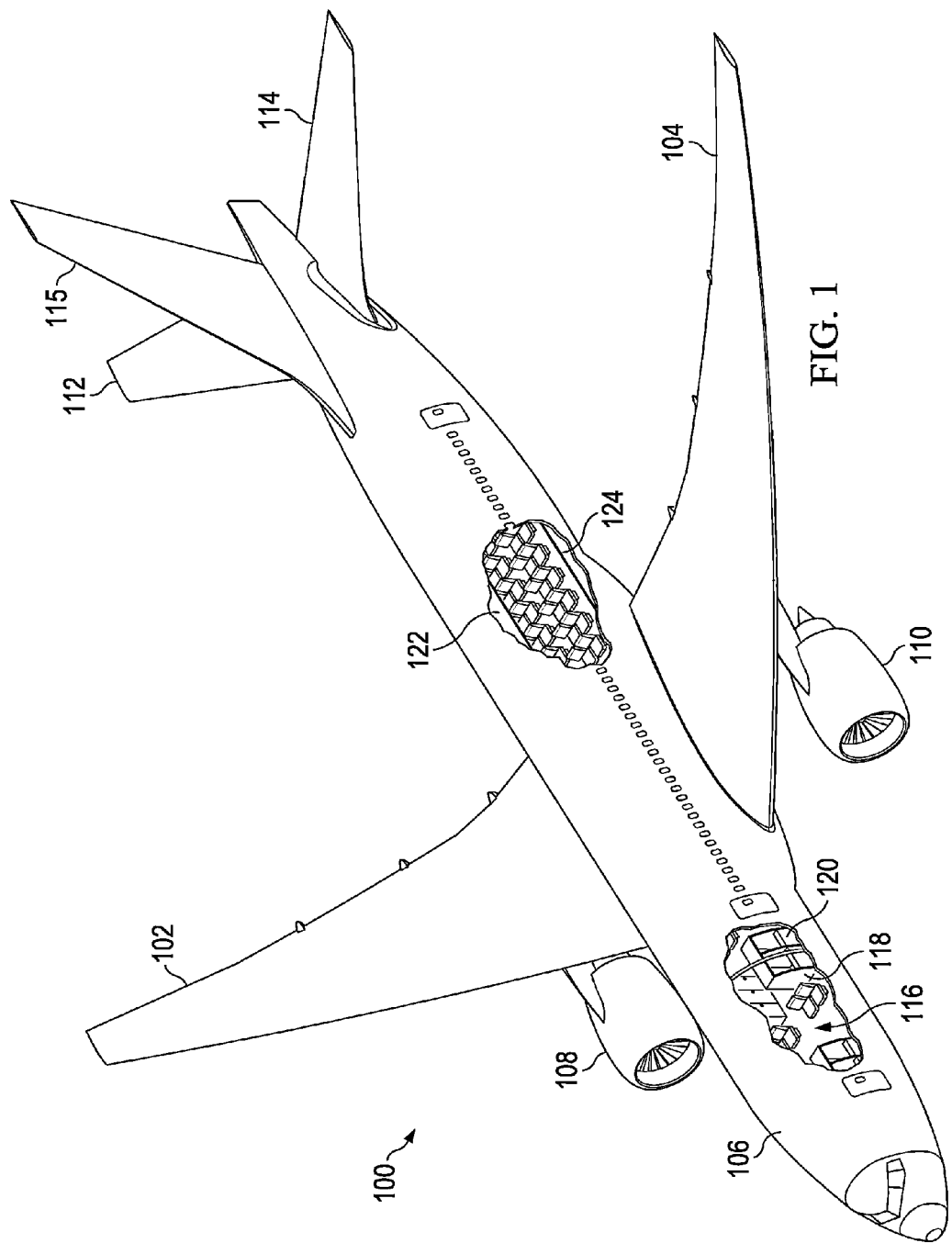
FIG. 1 is an illustration of an aircraft in which an illustrative embodiment may be implemented.

With reference now to the figures and, in particular, with reference to FIG. 1, an illustration of an aircraft is depicted in which an illustrative embodiment may be implemented. Aircraft 100 is an example of an aircraft in which noise reduction systems may be implemented in accordance with an illustrative embodiment.

In the illustrative example, aircraft 100 has wing 102 and wing 104 attached to fuselage 106. Aircraft 100 also includes engine 108 connected to wing 102 and engine 110 connected to wing 104. Aircraft 100 also has horizontal stabilizer 112, non-vertical stabilizer 114, and vertical stabilizer 115.

In these illustrative examples, noise reduction systems may be implemented in or with various composite components in aircraft 100. For example, a noise reduction system may be implemented in a composite panel for use within aircraft 100.

As depicted, an exposed view of interior 116 of aircraft 100 is shown. Within interior 116, one or more composite panels with a noise reduction system may be implemented. For example, a composite panel may be implemented in wall 118 of closet 120. As another illustrative example, a composite panel with a noise reduction system may be implemented in ceiling panel 122. As another illustrative example, a composite panel with a noise reduction system may be implemented in floor panel 124. Composite panels with noise reduction systems in accordance with an illustrative embodiment may be implemented in still other structures within aircraft 100 in these illustrative examples.

The noise reduction system implemented in a composite panel for aircraft 100 may reduce noise more efficiently than currently used noise reduction systems. Further, the weight of and space used by the noise reduction system may be less than those of currently available noise reduction systems.

Figure 2:
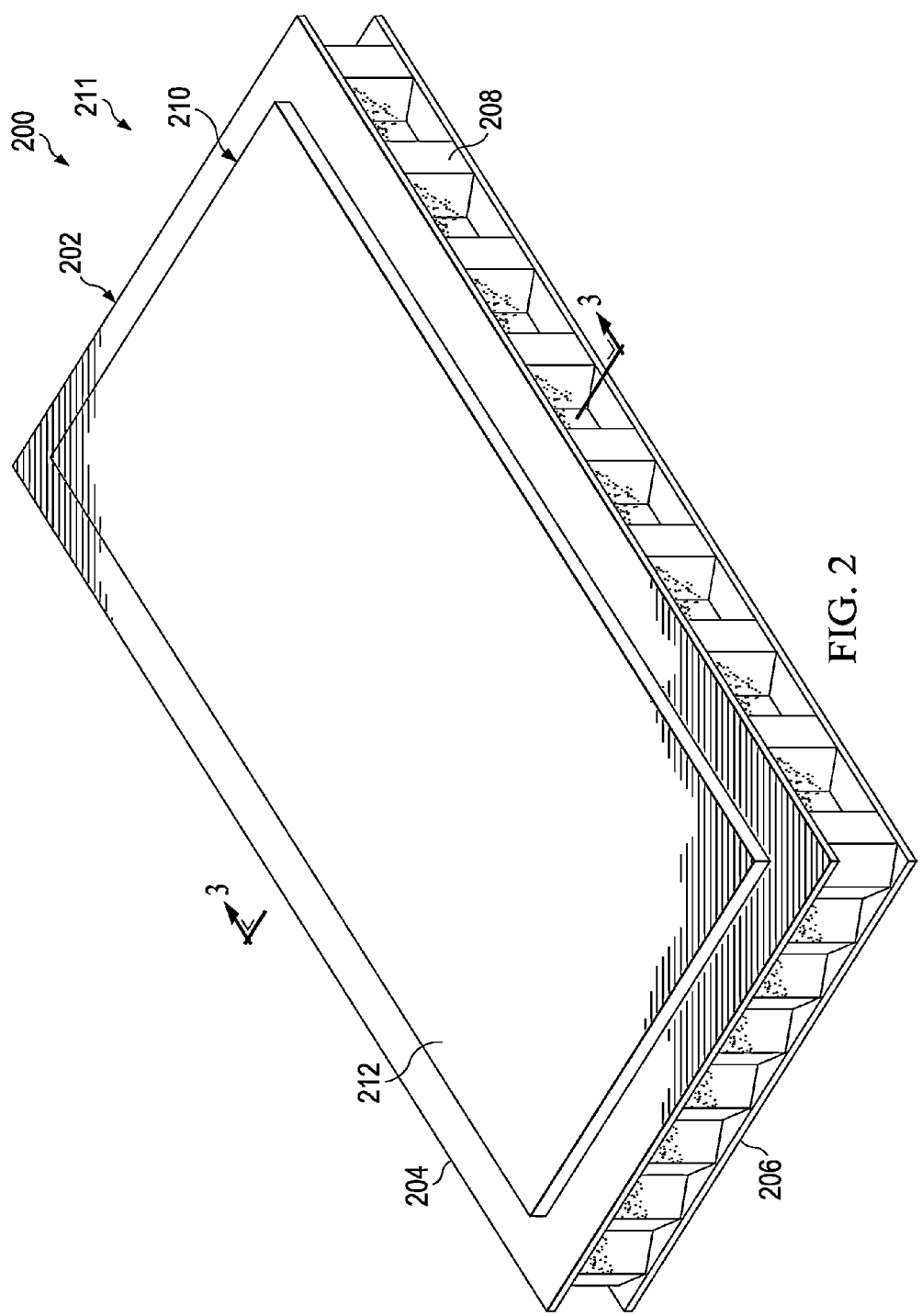
FIG. 2 is an illustration of a composite structure that can be used with a noise reduction system in accordance with an illustrative embodiment.

With reference now to FIG. 2, an illustration of a composite structure that can be used with a noise reduction system is depicted in accordance with an illustrative embodiment. Composite structure 200 is an example of a composite structure that may be used in aircraft 100 in FIG. 1.

In this illustrative example, composite structure 200 takes the form of composite panel 202. Composite panel 202 is a panel that may be used within aircraft 100 in FIG. 1. For example, without limitation, composite panel 202 may be used for a wall of a closet, a ceiling panel, as part of a floor structure, or some other suitable structure within aircraft 100.

As depicted, composite panel 202 comprises first face sheet 204 and second face sheet 206. Core 208 is located between first face sheet 204 and second face sheet 206. In these illustrative examples, first face sheet 204 and second face sheet 206 may be stiffer than core 208. Further, core 208 may be weaker than first face sheet 204 and second face sheet 206.

In this illustrative example, number of structures 210 in noise reduction system 211 is associated with first face sheet 204. In this illustrative example, number of structures 210 takes the form of layer 212.

When one component is "associated" with another component, the association is a physical association in these depicted examples. For example, a first component, layer 212, may be considered to be associated with a second component, first face sheet 204, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Number of structures 210 in noise reduction system 211 has a configuration that reduces a speed of waves propagating through composite panel 202 such that noise radiating from composite panel 202 is reduced. In particular, number of structures 210 may have a mass with a configuration to reduce the speed of waves propagating through composite panel 202.

In these illustrative examples, first face sheet 204 and second face sheet 206 may be comprised of various types of materials. These materials may include, for example, without limitation, glass epoxy, carbon or graphite epoxy, and other suitable materials.

Core 208 is less dense than first face sheet 204 and second face sheet 206. In these illustrative examples, core 208 may be solid or may have voids in the structure. For example, the voids may take the form of channels in a honeycomb structure. In other illustrative examples, core 208 may have voids that are closed rather than channels in a honeycomb-type structure. Of course, other types of structures may be used, depending on the particular implementation. Core 208 may be comprised of various materials, such as, for example, without limitation, paper, plastic, foam, a meta aramid material, a para aramid material, and other suitable types of materials.

Figure 3:
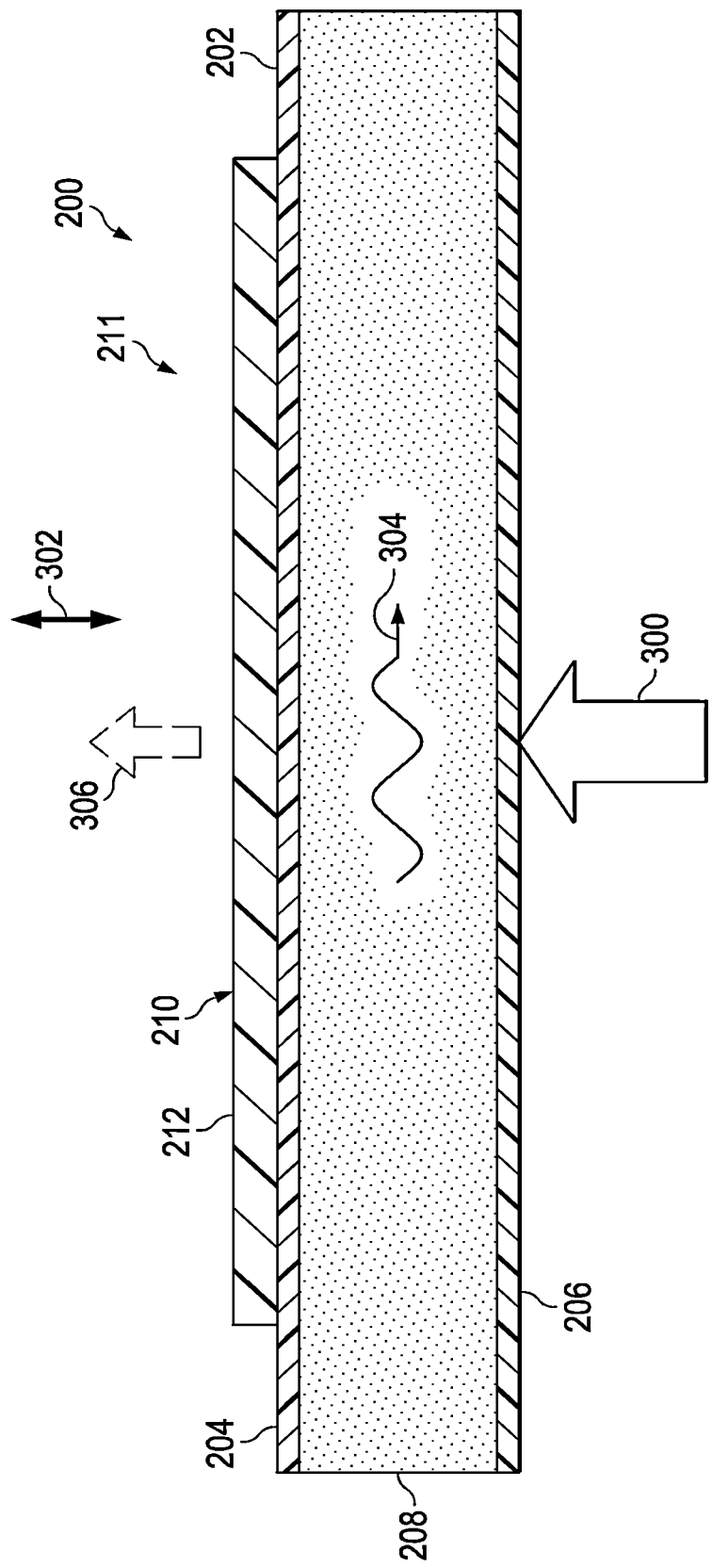
FIG. 3 is an illustration of a cross-sectional view of a composite panel in accordance with an illustrative embodiment.

Turning now to FIG. 3, a cross-sectional view of a composite panel is depicted in accordance with an illustrative embodiment. In this illustrative example, a cross-sectional view of composite panel 202 taken along lines 3-3 in FIG. 2 is depicted in accordance with an illustrative embodiment.

In this illustrative example, waves may travel through composite panel 202. In these illustrative examples, the waves may include shear waves and longitudinal waves. In this illustration, input 300 to composite panel 202 may cause shear wave 304. Input 300 may be, for example, a vibration and/or other movement.

As depicted, shear wave 304 travels through composite panel 202 and, in particular, through core 208. Shear wave 304 is a wave in which elastic deformation is substantially perpendicular to the direction of motion of shear wave 304. In other words, elastic deformation may occur in the direction of arrow 302 in this illustrative example.

As shear wave 304 travels through composite panel 202, sound 306 may be radiated from first face sheet 204. Sound 306 may be reduced through the use of layer 212 in number of structures 210 in noise reduction system 211 in these illustrative examples.

In this example, layer 212 adds mass that may reduce the speed of shear wave 304 as shear wave 304 travels through composite panel 202. In particular, the selection of the mass for layer 212 is made to reduce the speed of shear wave 304 to a speed that is less than the speed of sound. In this illustrative example, shear wave 304 may be reduced through shear wave 304 traveling through core 208.

Figure 4:
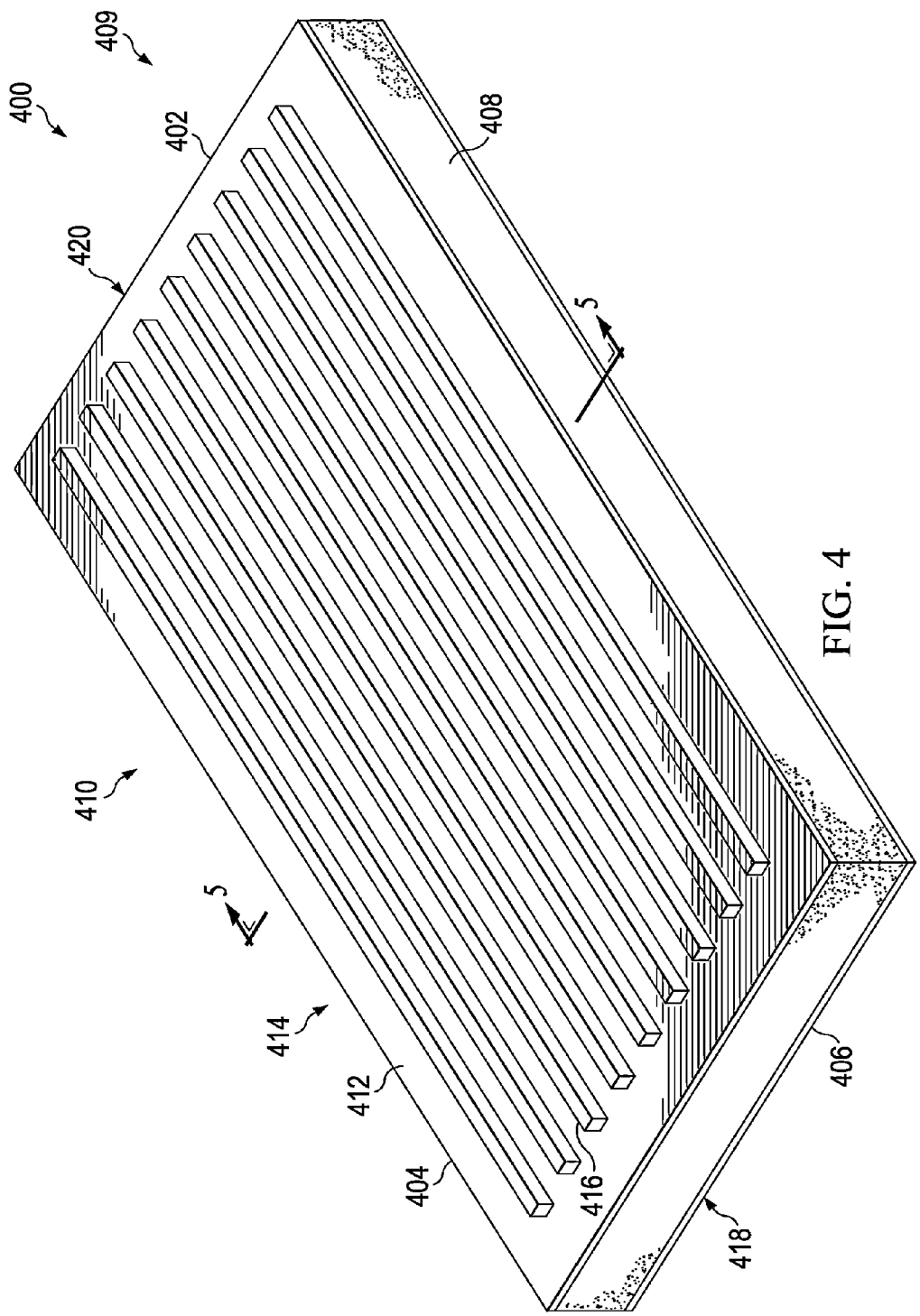
FIG. 4 is an illustration of a composite structure with a noise reduction system in accordance with an illustrative embodiment.

Turning next to FIG. 4, an illustration of a composite structure with a noise reduction system is depicted in accordance with an illustrative embodiment. As shown, an isometric view of composite structure 400 is depicted in accordance with an illustrative embodiment. In this illustrative example, composite structure 400 is an example of a composite structure that may be used in aircraft 100 in FIG. 1.

In particular, composite structure 400 takes the form of composite panel 402. As illustrated, composite panel 402 has first face sheet 404, second face sheet 406, and core 408. Core 408 is located between first face sheet 404 and second face sheet 406. Additionally, composite panel 402 is associated with noise reduction system 409.

In this illustrative example, noise reduction system 409 comprises number of structures 410. As depicted, number of structures 410 is located on outer surface 412 of first face sheet 404. Outer surface 412 is a surface exposed and not in contact with core 408 in these illustrative examples.

Number of structures 410 takes the form of elongate members 414. For example, elongate member 416 in elongate members 414 is located on outer surface 412 of first face sheet 404. Elongate member 416 extends from side 418 of composite panel 402 to side 420 of composite panel 402.

Figure 5:
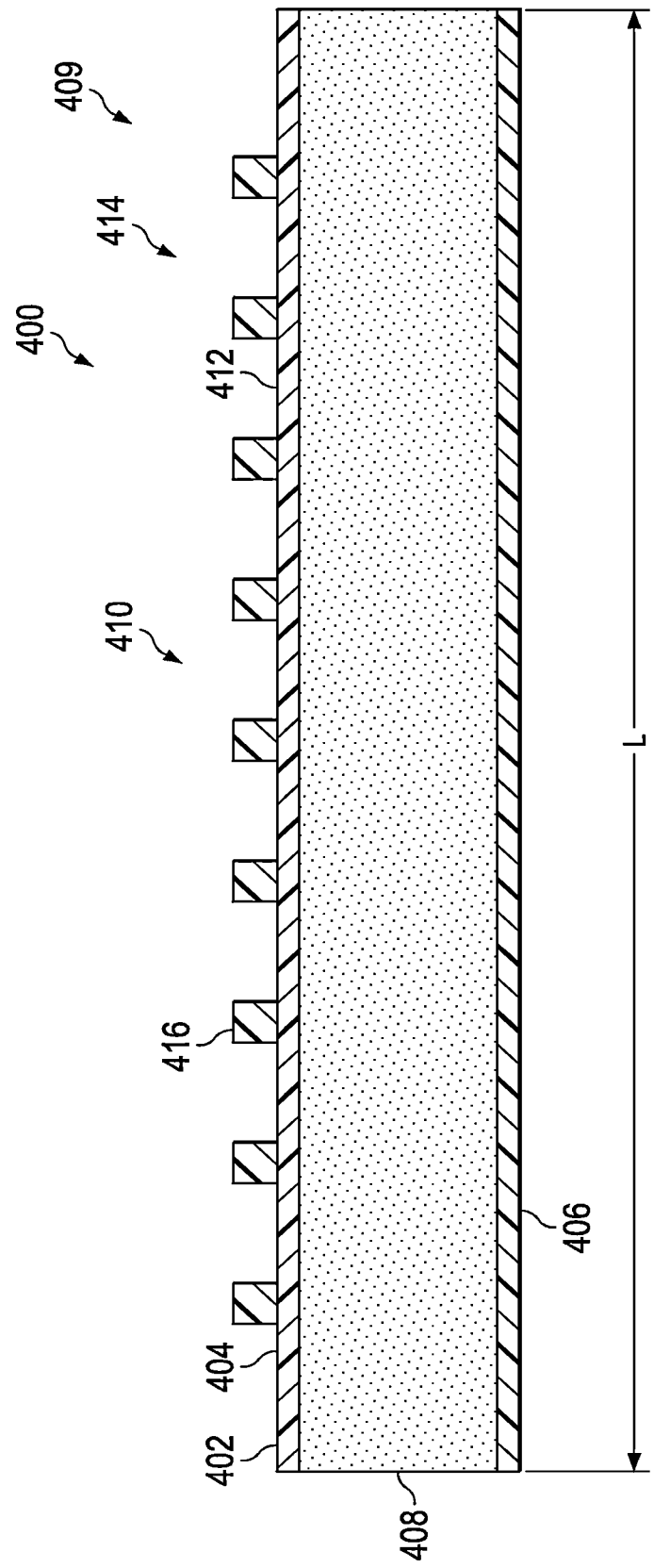
FIG. 5 is an illustration of a cross-sectional view of a composite panel in accordance with an illustrative embodiment.

Turning now to FIG. 5, an illustration of a cross-sectional view of a composite panel is depicted in accordance with an illustrative embodiment. In this illustrative example, the cross-sectional view of composite panel 402 is taken along lines 5-5 in FIG. 4.

In this illustrative example, elongate member 416 has a cross section in the shape of a square. Of course, elongate member 416 may have other shapes, depending on the particular implementation. For example, the cross section may be rectangular, trapezoidal, oval, circular, or some other suitable shape, depending on the particular implementation.

As can be seen in this illustrative example, elongate members 414 are substantially evenly spaced from each other and extend substantially parallel to each other. The spacing between elongate members 414, cross section shape, and other parameters for elongate members 414 is selected to reduce noise that radiates from composite panel 402. The amount of added weight from elongate members 414 may also be a factor. Balancing between the weight of composite panel 402 and a reduction in noise radiating from composite panel 402 may be performed.

Figure 6:
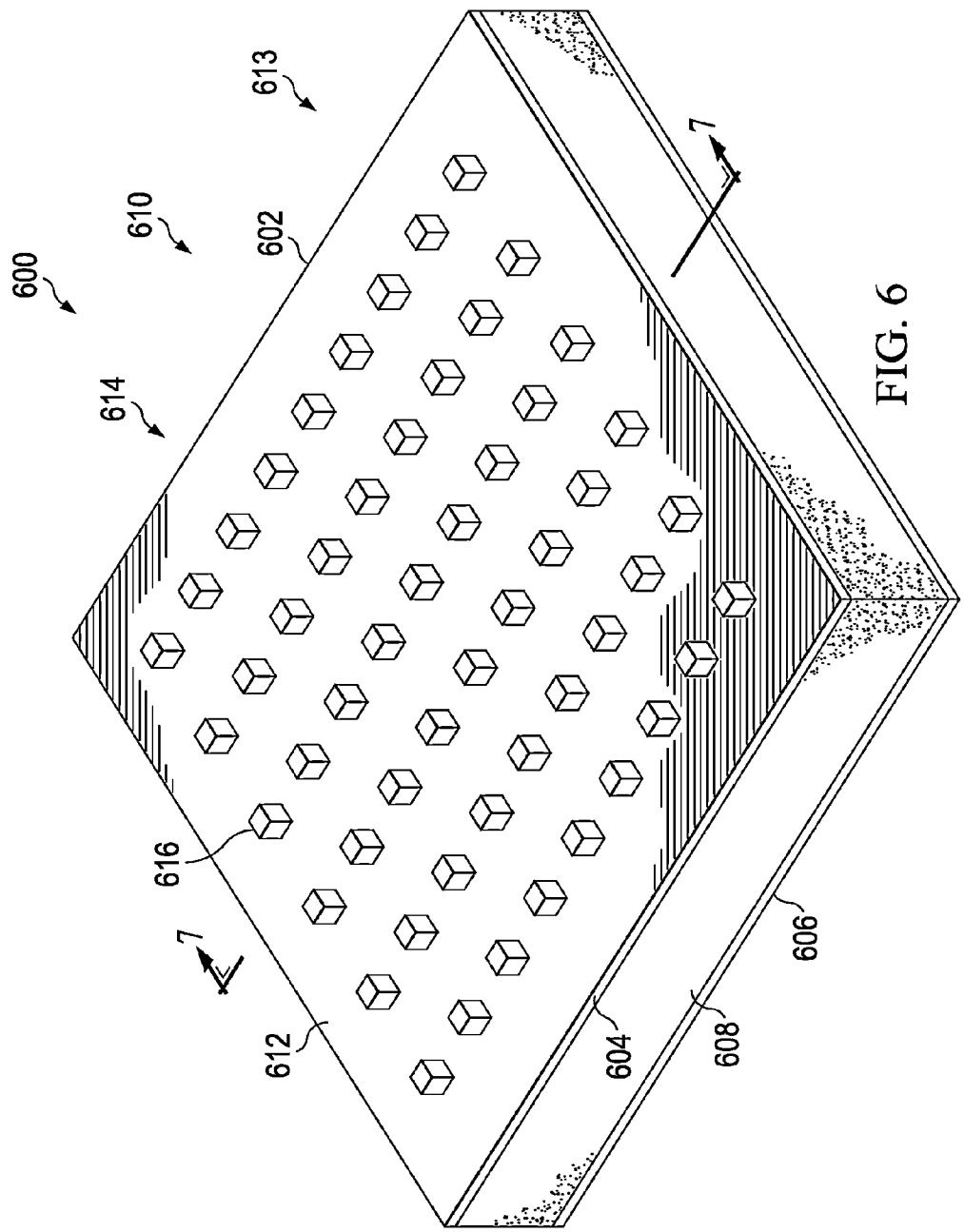
FIG. 6 is an illustration of a composite structure with a noise reduction system in accordance with an illustrative embodiment.

With reference now to FIG. 6, an illustration of a composite structure with a noise reduction system is depicted in accordance with an illustrative embodiment. Composite structure 600 is another example of a composite structure that may be used in components in aircraft 100 in FIG. 1.

In this illustrative example, composite structure 600 takes the form of composite panel 602. Composite panel 602 has first face sheet 604, second face sheet 606, and core 608. Core 608 is located between first face sheet 604 and second face sheet 606.

In this illustrative example, noise reduction system 610 is located on outer surface 612 of first face sheet 604. Noise reduction system 610 comprises number of structures 613. In these illustrative examples, number of structures 613 takes the form of patches 614. In this illustrative example, patch 616 in patches 614 has the shape of a cube. Other shapes that may be used for patches 614 may include a sphere, a pyramid, a cuboid, a cylinder, or some other suitable shape. Of course, patch 616 may have other shapes, depending on the particular implementation.

Figure 7:
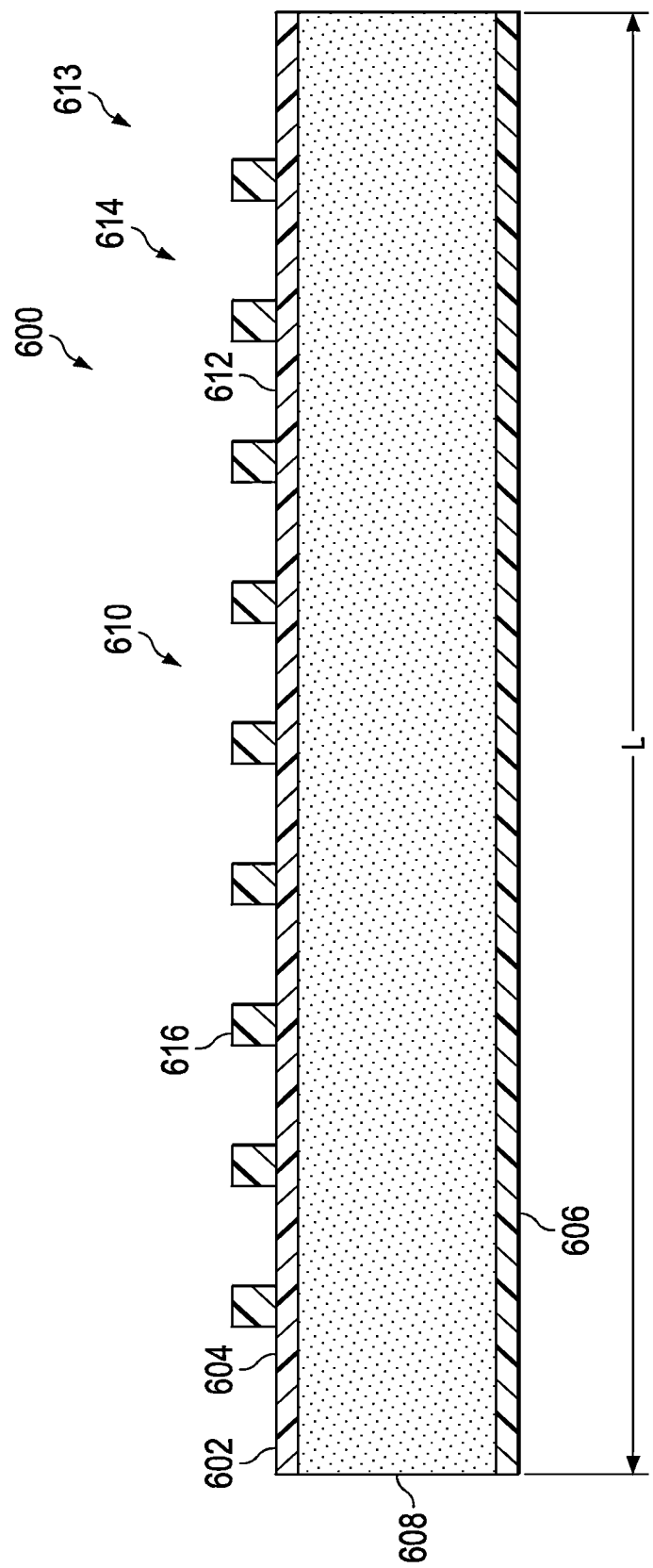
FIG. 7 is an illustration of a cross-sectional view of a composite structure with a noise reduction system in accordance with an illustrative embodiment.

With reference now to FIG. 7, a cross-sectional view of a composite structure with a noise reduction system is depicted in accordance with an illustrative embodiment. A cross-sectional view of composite panel 602 is seen taken along lines 7-7 in FIG. 6 in this illustrative example.

Figure 8:
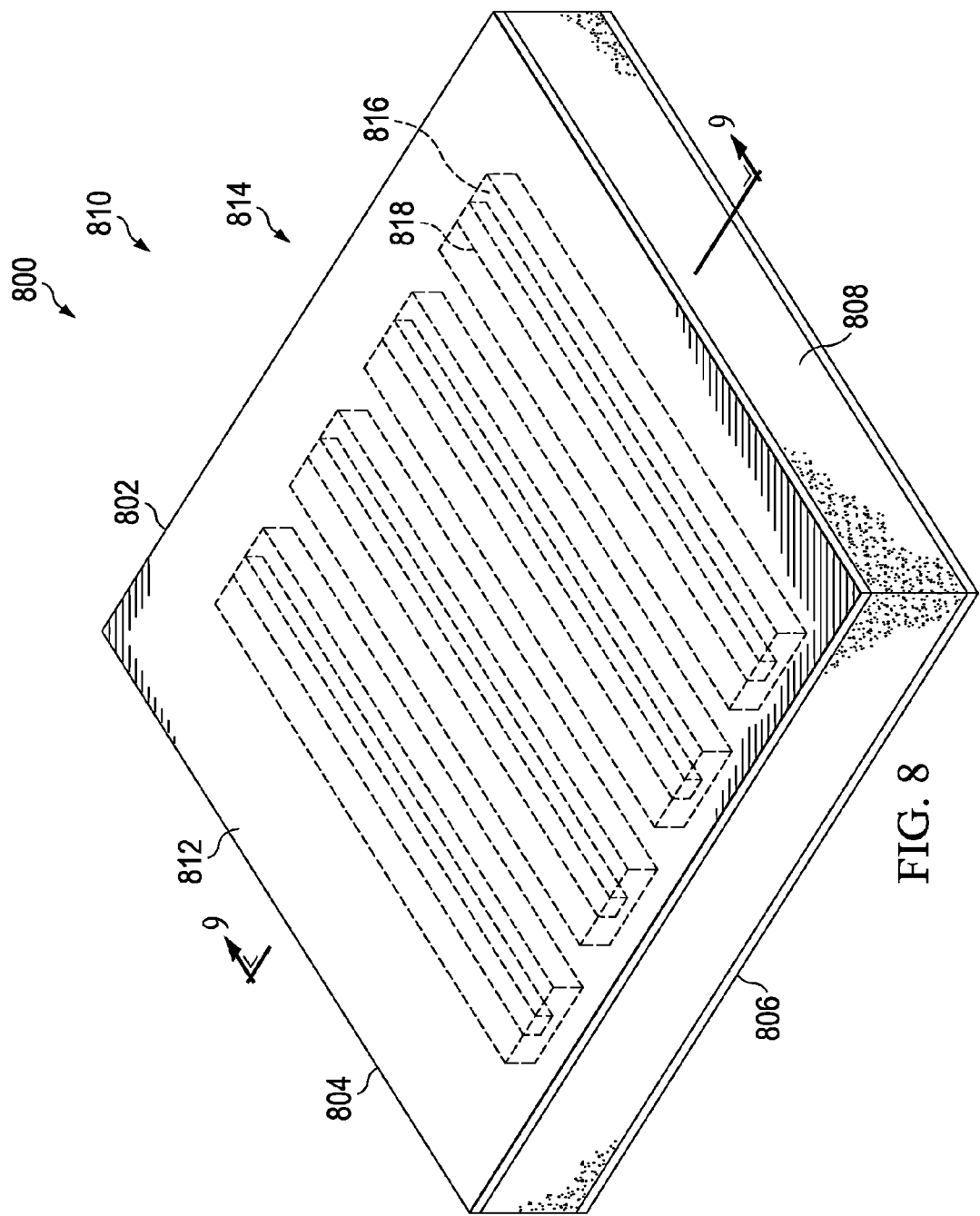
FIG. 8 is an illustration of a composite structure with a noise reduction system in accordance with an illustrative embodiment.

With reference now to FIG. 8, an illustration of a composite structure with a noise reduction system is depicted in accordance with an illustrative embodiment. In this illustrative example, composite structure 800 is another example of a composite structure that may be used in aircraft 100.

Composite structure 800 is composite panel 802 with first face sheet 804, second face sheet 806, and core 808 located between the face sheets. In this illustrative example, noise reduction system 810 is located inside of composite panel 802 rather than on outer surface 812 of first face sheet 804. In this illustrative example, core 808 is attached to outer surface 812 of first face sheet 804.

As depicted, noise reduction system 810 comprises number of structures 814. Number of structures 814 is configured to reduce a speed of waves traveling through composite panel 802. In this illustrative example, number of structures 814 comprises voids 816 and elongate members 818 located in voids 816 inside of composite panel 802. These components are shown in phantom in this illustrative example. In these illustrative examples, structures take the form of elongate members 818.

Figure 9:
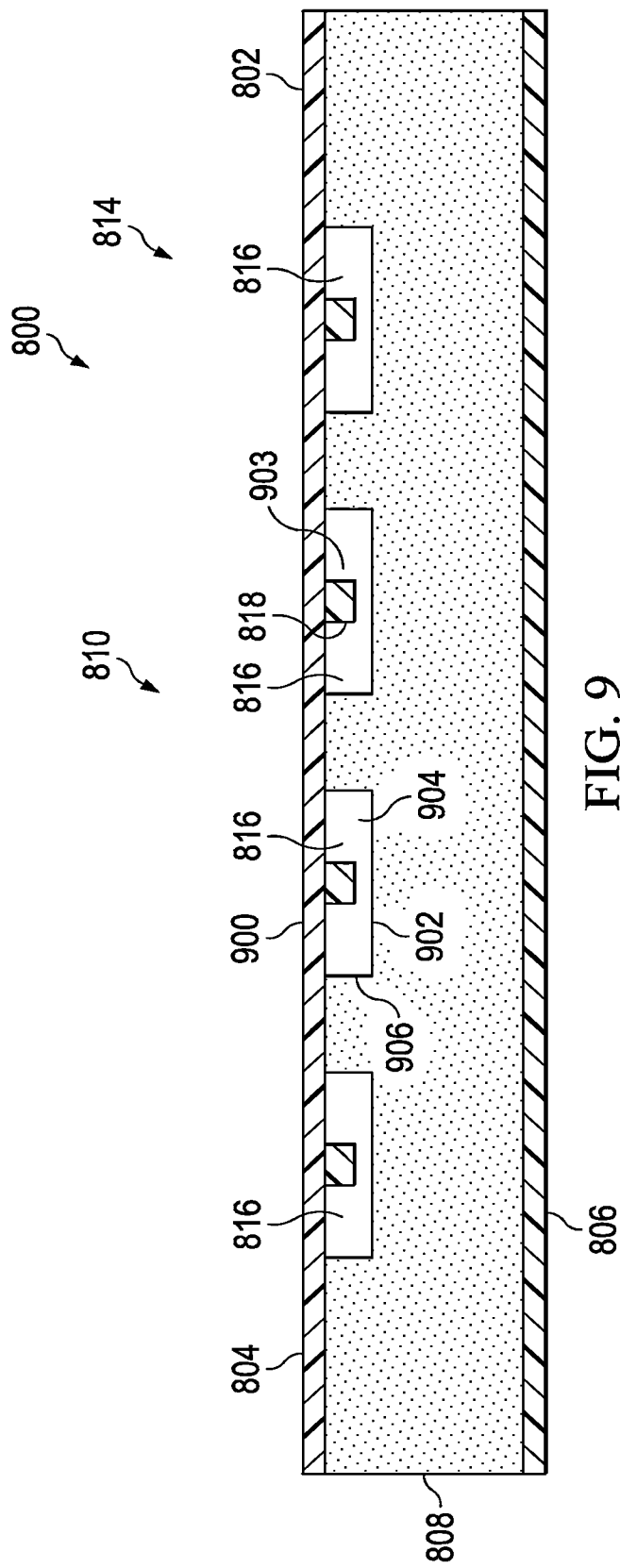
FIG. 9 is an illustration of a cross-sectional view of a composite panel in accordance with an illustrative embodiment.

With reference now to FIG. 9, a cross-sectional view of a composite panel is depicted in accordance with an illustrative embodiment. In this illustrative example, a cross-sectional view of composite panel 802 is seen taken along lines 9-9 in FIG. 8.

As can be seen in this view, voids 816 are formed within core 808. Voids 816 are configured such that gaps 903 are present between elongate members 818 and core 808. In other words, elongate members 818 do not touch core 808 in these illustrative examples.

For example, elongate member 900 in elongate members 818 is located within void 902 in voids 816. As can be seen, gap 904 is present between elongate member 900 and walls 906 of core 808.

Figure 10:
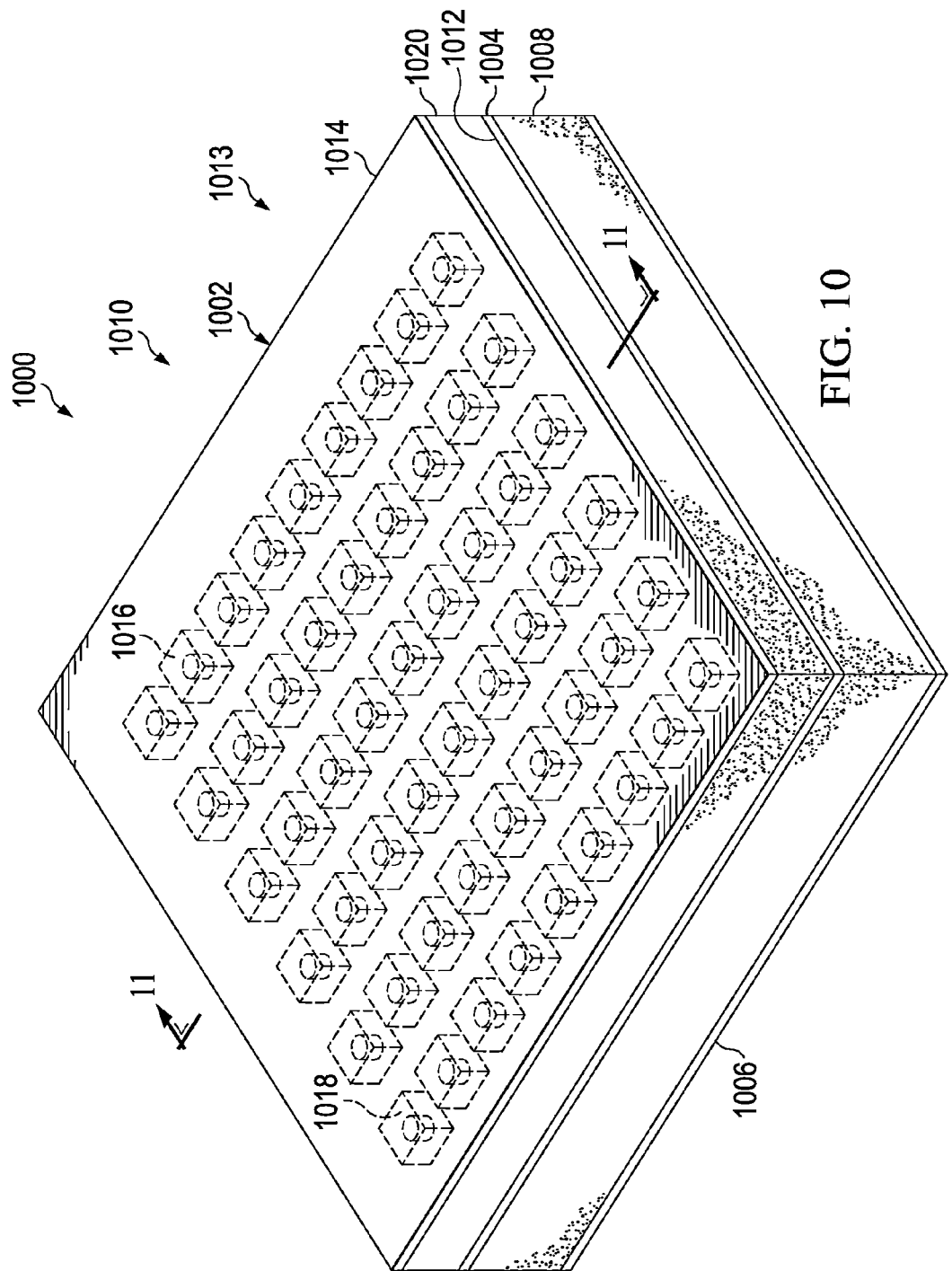
FIG. 10 is an illustration of a composite structure in accordance with an illustrative embodiment.

Turning next to FIG. 10, an illustration of a composite structure is depicted in accordance with an illustrative embodiment. In this illustrative example, composite structure 1000 takes the form of composite panel 1002 and is another example of a composite structure that may be used within aircraft 100.

As depicted, composite panel 1002 includes first face sheet 1004, second face sheet 1006, and core 1008 located between first face sheet 1004 and second face sheet 1006. Noise reduction system 1010 is associated with outer surface 1012 of first face sheet 1004.

As can be seen in this illustrative example, noise reduction system 1010 has number of structures 1013. As depicted, number of structures 1013 comprises third face sheet 1014, patches 1016, voids 1018, and core 1020. Number of structures 1013 has a mass configured to reduce a speed of waves traveling through composite panel 1002. As depicted, patches 1016 are located under third face sheet 1014 in voids 1018 formed in core 1020 of noise reduction system 1010. Patches 1016 and voids 1018 are shown in phantom in core 1020 in this depicted example.

Core 1020 is a second core and is located on outer surface 1012 of first face sheet 1004. As a result, core 1020 is located between third face sheet 1014 of noise reduction system 1010 and first face sheet 1004 of composite panel 1002.

Figure 11:
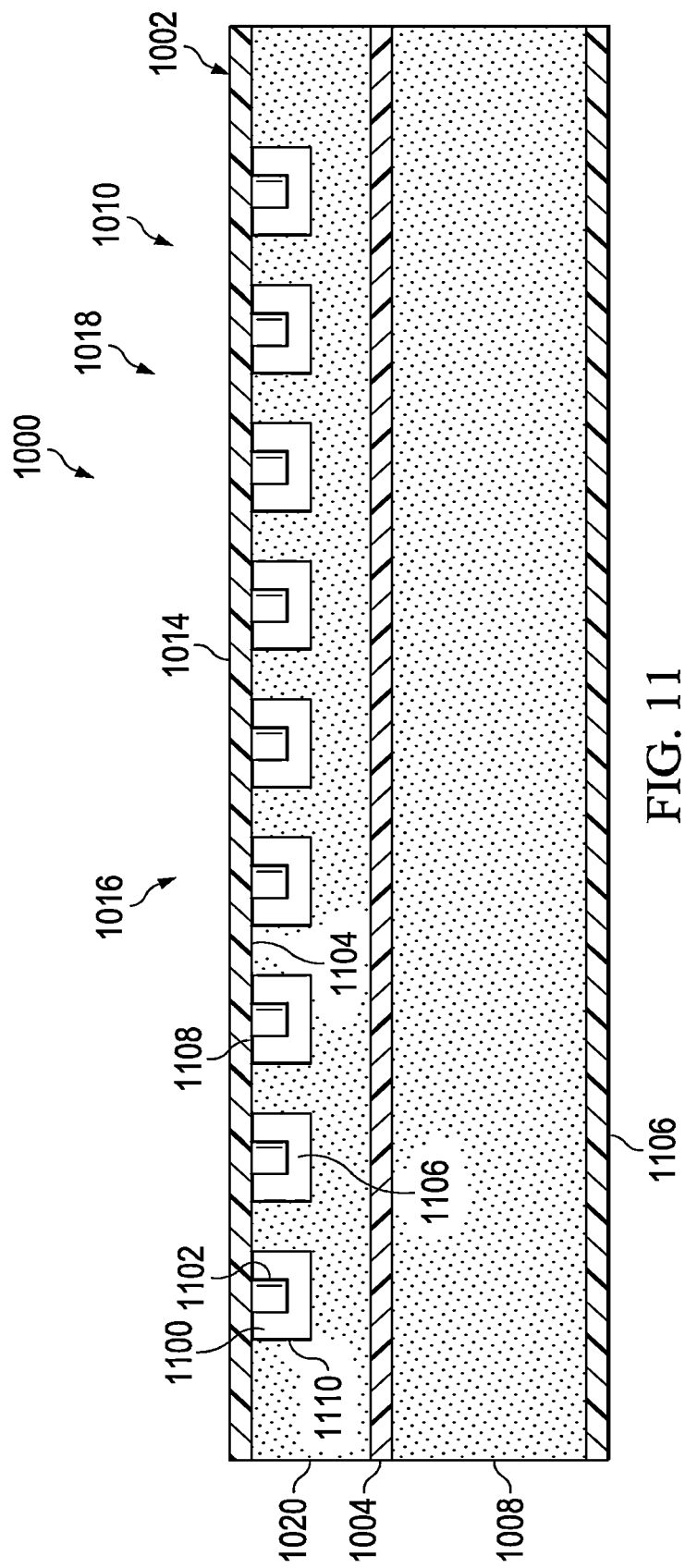
FIG. 11 is an illustration of a cross-sectional view of a composite structure in accordance with an illustrative embodiment.

Turning next to FIG. 11, an illustration of a cross-sectional view of a composite structure is depicted in accordance with an illustrative embodiment. In this illustrative example, a cross-sectional view of composite panel 1002 taken along lines 11-11 in FIG. 10 is depicted.

As can be seen, voids 1018 provide gaps 1100 between patches 1016 and core 1020. For example, patch 1102 is attached to inner surface 1104 of third face sheet 1014. Void 1106 in voids 1018 provides gap 1108 between walls 1110 of core 1008 and patch 1102. In these illustrative examples, patch 1102 takes the form of a cylinder. Of course, other shapes may be used. For example, a sphere, a cube, and other suitable shapes may be used. Further, a mix of shapes may be used in the illustrative examples.

In these illustrative examples, core 1020 and core 1008 may be made of the same type of material or different types of materials, depending on the particular implementation. The material selected for core 1020 may be based on the speed of waves in core 1020 that will slow down the speed of waves in core 1008. In particular, the waves are shear waves. The material selected may have a shear modulus that is lower than the shear modulus of core 1008. The difference in the shear modulus is selected to result in a desired reduction in the speed of shear waves in core 1008.

The illustration of noise reduction systems used with composite structures in the form of composite panels in FIGS. 2-11 are not meant to imply limitations to the manner in which different illustrative embodiments may be implemented. Other components may be used in addition to and/or in place of the ones illustrated. Also, other configurations may be present.

For example, structures for reducing noise may be placed on both face sheets instead of just one face sheet as depicted in the illustrative examples. In still other illustrative examples, structures may be located both on the outside and on the inside of the composite panel.

In still other illustrative examples, the noise reduction systems may be used with other types of composite structures. For example, the noise reduction systems illustrated in the figures may be used with composite skin-stringer-structures and other suitable structures.

Figure 12:
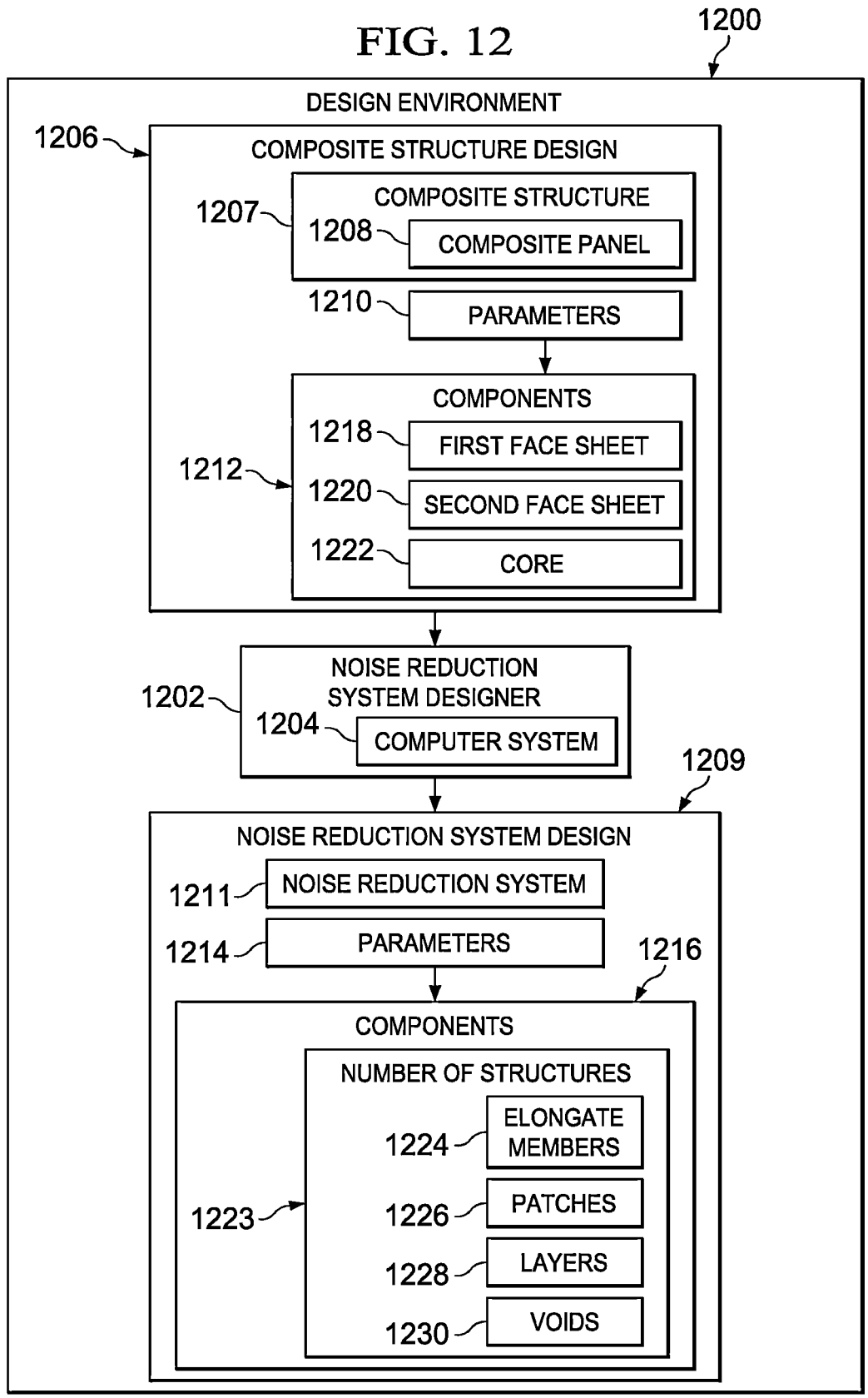
FIG. 12 is an illustration of a design environment for designing noise reduction systems for composite structures in accordance with an illustrative embodiment.

Turning next to FIG. 12, an illustration of a design environment for designing noise reduction systems for composite structures is depicted in accordance with an illustrative embodiment. In this illustrative example, design environment 1200 includes noise reduction system designer 1202, which is used to design noise reduction systems. These noise reduction systems may be used with composite structures, such as those found in aircraft 100 in FIG. 1.

As depicted, noise reduction system designer 1202 may be implemented using hardware, software, or a combination of the two. In these illustrative examples, noise reduction system designer 1202 may be implemented in computer system 1204. Computer system 1204 is one or more computers in these illustrative examples. When more than one computer is present in computer system 1204, those computers may be in communication with each other using a local area network, the Internet, or some other suitable type of communications media.

In this illustrative example, noise reduction system designer 1202 may receive composite structure design 1206. Composite structure design 1206 is for composite structure 1207 in this illustrative example. Composite structure 1207 may be, for example, composite panel 1208. Composite structure design 1206 may be, for example, an input to produce noise reduction system design 1209.

In this illustrative example, noise reduction system designer 1202 analyzes composite structure design 1206 to generate noise reduction system design 1209 for noise reduction system 1211. Noise reduction system design 1209 may include just the noise reduction system or also may include the composite structure in composite structure design 1206 within the design.

Noise reduction system designer 1202 takes into account parameters 1210 in composite structure design 1206. Parameters 1210 are for components 1212 that may be part of the composite structure. In these illustrative examples, components 1212 for composite structure design 1206 include first face sheet 1218, second face sheet 1220, and core 1222.

Parameters 1210 may include various parameters, such as, for example, dimensions, materials, and other suitable parameters. Parameters 1210 may be used to simulate waves that may travel through a composite structure, such as a composite panel.

With parameters 1210, noise reduction system designer 1202 generates parameters 1214 for noise reduction system design 1209. In these illustrative examples, parameters 1214 are for components 1216 in noise reduction system design 1209.

In generating noise reduction system design 1209 for noise reduction system 1211, the speed of shear waves in core 1222 is taken into account. The speed of shear waves in a core material is defined as follows:

$$C_{mc} = \left[\frac{G_c}{\rho_c}\right]^{1/2}$$

where $C_{mc}$ is the speed of shear waves in the core material, $G_c$ is the shear modulus, and $\rho_c$ is the density of the core.

In these illustrative examples, noise reduction system designer 1202 takes into account that the mass of first face sheet 1218 and second face sheet 1220 may change the speed of shear waves through the composite panel. The speed of shear waves through the composite panel is as follows:

$$C_s = \left[\left(\frac{1}{1+2\rho_f t_f/\rho_c t_c}\right)\frac{G_c}{\rho_c}\right]^{1/2}$$

where $C_s$ is the speed of shear waves through the composite panel, $G_c$ is the shear modulus, $\rho_c$ is the density of the core, and $t_c$ is the thickness of the core, $\rho_f$ is the density of the face sheets, and $t_f$ is the thickness of the face sheets.

The different illustrative embodiments recognize and take into account that at low frequencies, a composite panel having a sandwich structure may be dominated by bending of the entire structure. In these illustrative examples, low frequencies are frequencies from about 100 Hz to about 500 Hz. At very high frequencies, the composite panel has a response that is mostly controlled by the bending characteristics of the face sheets. In these illustrative examples, very high frequencies are frequencies above about 10,000 Hz. The different illustrative embodiments also recognize and take into account that the shear waves in the composite panel govern the behavior of the composite panel in the mid-frequency region. The mid-frequency range is from about 500 Hz to about 10,000 Hz in these examples.

The different illustrative embodiments recognize and take into account that these modes may exist whether the core is a honeycomb core or a solid core in a composite panel. The different illustrative embodiments recognize and take into account that in the mid-frequency region, a majority of the vibration energy may be carried in the core in shear waves traveling through the core. At low frequencies, most of the energy may be carried though the face sheets. Further, the different illustrative embodiments recognize and take into account that at high frequencies, the bending modes of the face sheets may dominate the vibration and noise radiation.

As a result, noise reduction system designer 1202 generates noise reduction system design 1209 for noise reduction system 1211 in a manner that reduces the speed of waves traveling though a composite structure. In particular, noise reduction system designer 1202 may generate noise reduction system design 1209 to cause waves traveling through a composite structure using composite structure design 1206 to be reduced to a speed that is less than the speed of sound.

In these illustrative examples, noise reduction system designer 1202 generates noise reduction system design 1209 for noise reduction system 1211 in a manner that increases the mass of at least one of first face sheet 1218, second face sheet 1220, or both.

In these illustrative examples, by increasing the mass, the shear wave speed may be shown as follows:

$$C_s = \left[\left(\frac{1}{1+(2\rho_f t_f + \rho_{add} t_{add})/\rho_c t_c}\right)\frac{G_c}{\rho_c}\right]^{1/2}$$

where $C_s$ is the speed of shear waves, $G_c$ is the shear modulus, $\rho_c$ is the density of the core, $t_c$ is the thickness of the core, $\rho_f$ is the density of the face sheets, $t_f$ is the thickness of the face sheets, $\rho_{add}$ is the density of the added mass to a face sheet, and $L_{add}$ is the added thickness to a face sheet.

In these illustrative examples, noise reduction system designer 1202 may generate components 1216 for number of structures 1223 in noise reduction system 1211, such as elongate members 1224, patches 1226, layers 1228, and other suitable forms in which additional mass may be added to first face sheet 1218, second face sheet 1220, or both. In these illustrative examples, components 1216 may be attached to first face sheet 1218, second face sheet 1220, or both, depending on the particular implementation.

In these illustrative examples, voids 1230 may be components in components 1216 in noise reduction system design 1209. Voids 1230 may be cavities inside of the composite structure. Voids 1230 may be cavities in which elongate members 1224, patches 1226, or other structures may be located. Voids 1230 may provide a gap between these components and core 1222. Depending on the particular implementation, voids 1230 may be formed in core 1222. Voids 1230 may be used when elongate members 1224 or patches 1226 are located inside of the composite structure rather than on the surface of the composite structure.

Additionally, noise reduction system designer 1202 also generates parameters 1214 for components 1216. These parameters may include, for example, without limitation, shape, an amount of mass, location, and other suitable parameters for the different components. These parameters are selected to reduce the speed of waves traveling through a composite structure. The parameters also may be selected to reduce energy in the face sheets.

In this manner, components 1216 may reduce the speed of a wave. Components 1216 do not need to absorb vibration energy or be tuned to specific temperatures in the illustrative examples. Further, these components do not need to absorb acoustic energy like fiberglass blankets. They also do not move like acoustic and/or vibration resonators to absorb sound. Further, components 1216 are designed to maintain the structural functions of the composite structures to which they are associated.

These designs may be more lightweight and efficient in reducing noise as compared to currently used noise reduction systems. Further, the noise reduction systems are insensitive to temperature, because the properties of components 1216, such as elongate members, are not temperature dependent.

Further, these noise reduction systems may be added on or integrated into existing components rather than functioning as separate systems from the composite structures from which they reduce noise.

Figure 13:
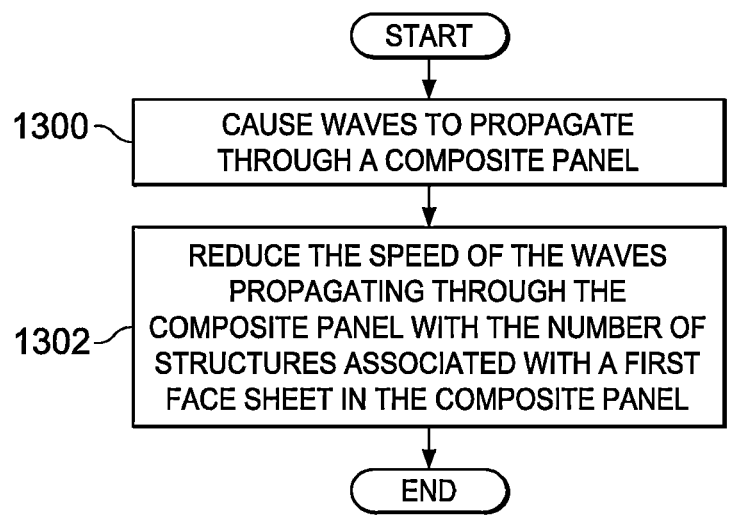
FIG. 13 is an illustration of a flowchart of a process for reducing noise in accordance with an illustrative embodiment.

With reference now to FIG. 13, an illustration of a flowchart of a process for reducing noise is depicted in accordance with an illustrative embodiment. The process illustrated in FIG. 13 may be implemented in aircraft 100 in FIG. 1. In particular, the process may be implemented in composite structures used in aircraft 100. Still more particularly, this process may be applied to a composite panel. The number of structures has a mass with a configuration to reduce a speed of the waves propagating through a composite panel such that noise radiating from the composite panel is reduced. In these illustrative examples, these waves may take the form of shear waves.

The process begins by causing waves to propagate through a composite panel (operation 1300). The process then reduces the speed of the waves propagating through the composite panel with the number of structures associated with a first face sheet in the composite panel (operation 1302), with the process terminating thereafter.

Reducing the speed of waves propagating through the composite panel may reduce the amount of noise radiated from the composite panel. In particular, the amount of noise radiated may be reduced when the speed of the waves is reduced to a speed less than the speed of sound.

The flowchart and block diagrams in the different depicted embodiments illustrate the architecture, functionality, and operation of some possible implementations of apparatuses and methods in an illustrative embodiment. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowchart or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 14:
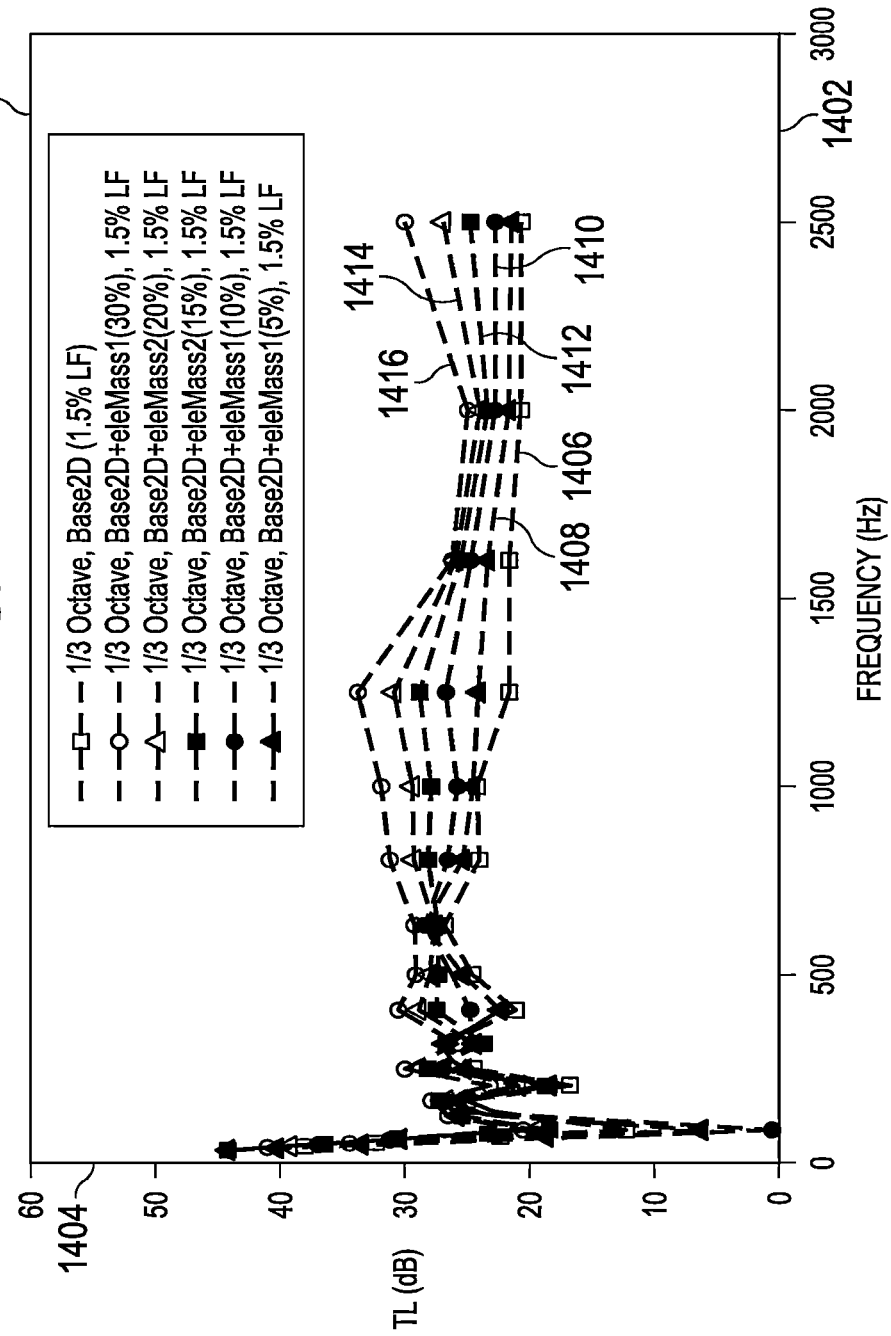
FIG. 14 is an illustration of a graph of noise reduction results in accordance with an illustrative embodiment.

Turning now to FIG. 14, an illustration of a graph of noise reduction results is depicted in accordance with an illustrative embodiment. In this illustrative example, graph 1400 illustrates transmission losses for different noise reduction systems in accordance with an illustrative embodiment.

X-axis 1402 illustrates frequency in Hertz. Y-axis 1404 illustrates sound transmission loss in decibels. In this illustrative example, graph 1400 includes line 1406, line 1408, line 1410, line 1412, line 1414, and line 1416.

Line 1406 illustrates transmission loss through a composite panel without the use of a noise reduction system in accordance with an illustrative embodiment. Line 1408, line 1410, line 1412, line 1414, and line 1416 illustrate noise reduction systems in which masses are added in the form of elongate members to the surface of a face sheet. As can be seen, the addition of elongate members with additional mass increases the transmission loss of a composite panel.

Figure 15:
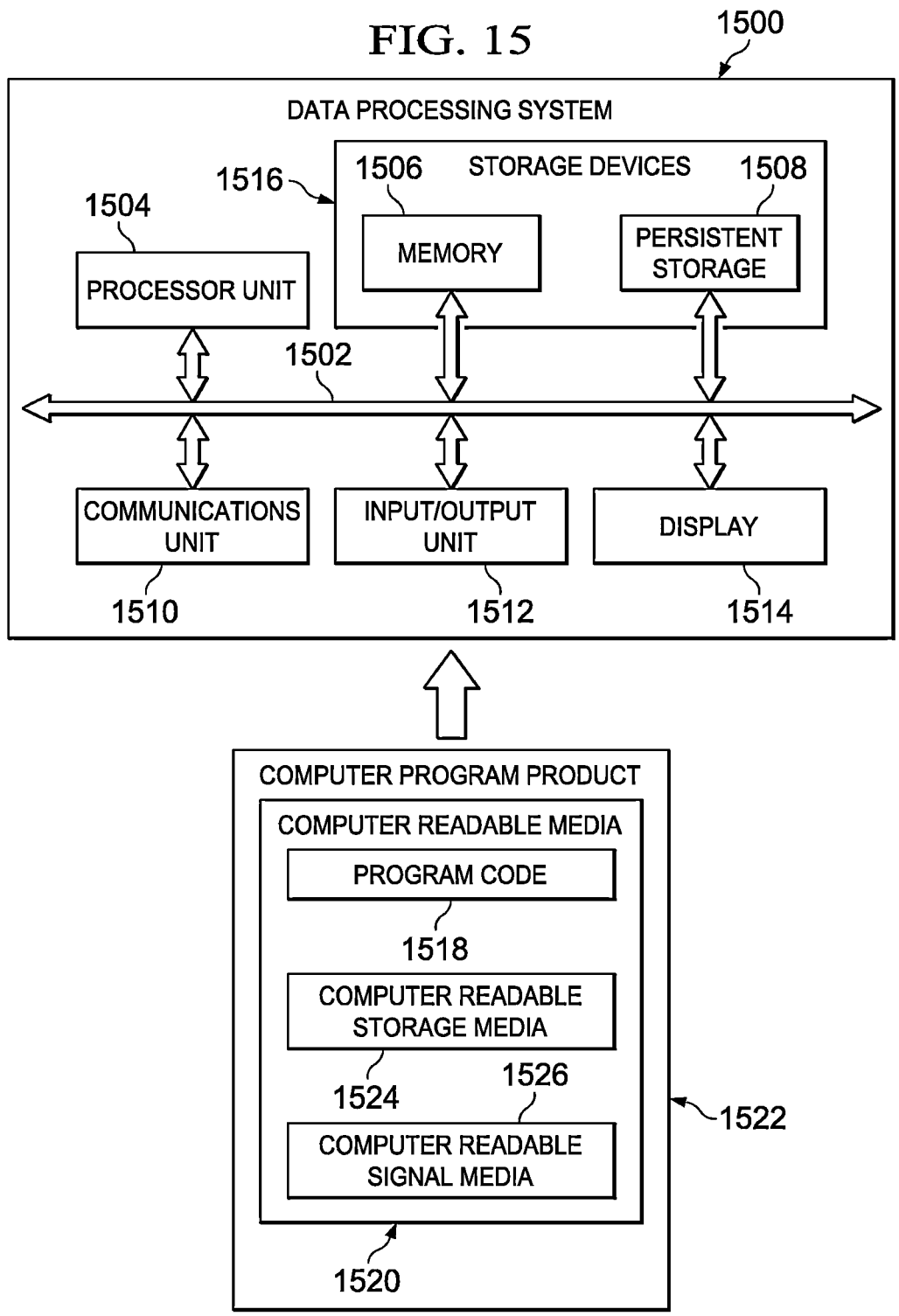
FIG. 15 is an illustration of a data processing system in accordance with an illustrative embodiment.

Turning now to FIG. 15, an illustration of a data processing system is depicted in accordance with an illustrative embodiment. Data processing system 1500 may be used to implement one or more computers in computer system 1204 in FIG. 12. In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 may take the form of a bus system.

Processor unit 1504 serves to execute instructions for software that may be loaded into memory 1506. Processor unit 1504 may be a number of processors, a multi-processor core, or some other type of processor, depending on the particular implementation.

Memory 1506 and persistent storage 1508 are examples of storage devices 1516. A storage device is any piece of hardware that is capable of storing information, such as, for example, without limitation, data, program code in functional form, and/or other suitable information either on a temporary basis and/or a permanent basis. Storage devices 1516 may also be referred to as computer readable storage devices in these illustrative examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above.

Communications unit 1510, in these illustrative examples, provides for communications with other data processing systems or devices. In these illustrative examples, communications unit 1510 is a network interface card.

Input/output unit 1512 allows for input and output of data with other devices that may be connected to data processing system 1500. For example, input/output unit 1512 may provide a connection for user input through a keyboard, a mouse, and/or some other suitable input device. Further, input/output unit 1512 may send output to a printer. Display 1514 provides a mechanism to display information to a user.

Instructions for the operating system, applications, and/or programs may be located in storage devices 1516, which are in communication with processor unit 1504 through communications framework 1502. The processes of the different embodiments may be performed by processor unit 1504 using computer-implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these illustrative examples. In one example, computer readable media 1520 may be computer readable storage media 1524 or computer readable signal media 1526.

In these illustrative examples, computer readable storage media 1524 is a physical or tangible storage device used to store program code 1518 rather than a medium that propagates or transmits program code 1518.

Alternatively, program code 1518 may be transferred to data processing system 1500 using computer readable signal media 1526. Computer readable signal media 1526 may be, for example, a propagated data signal containing program code 1518. For example, computer readable signal media 1526 may be an electromagnetic signal, an optical signal, and/or any other suitable type of signal.

The different components illustrated for data processing system 1500 are not meant to provide architectural limitations to the manner in which different embodiments may be implemented. The different illustrative embodiments may be implemented in a data processing system including components in addition to and/or in place of those illustrated for data processing system 1500. Other components shown in FIG. 15 can be varied from the illustrative examples shown. The different embodiments may be implemented using any hardware device or system capable of running program code 1518.

Illustrative embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an illustrative embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 takes place. Thereafter, aircraft 1700 may go through certification and delivery 1610 in order to be placed in service 1612. While in service 1612 by a customer, aircraft 1700 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an illustrative embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16.

As yet another example, one or more apparatus embodiments, method embodiments, or a combination thereof may be utilized during production stages, such as component and subassembly manufacturing 1606 and system integration 1608 in FIG. 16. For example, a composite panel or other composite structure may be manufactured with a noise reduction system in accordance with an illustrative embodiment.

One or more apparatus embodiments, method embodiments, or a combination thereof may be utilized while aircraft 1700 is in service 1612 and/or during maintenance and service 1614 in FIG. 16. For example, a noise reduction system may be added to existing composite structures or a new composite structure may be manufactured with the noise reduction system during maintenance and service 1614. The use of a number of the different illustrative embodiments may substantially expedite the assembly of and/or reduce the cost of aircraft 1700.

In addition, although the illustrative examples have been depicted for use in reducing noise in an aircraft, one or more illustrative embodiments may be applied to other types of platforms. For example, one or more illustrative embodiments may be implemented in a platform selected from one of a mobile platform, a stationary platform, a land-based structure, an aquatic-based structure, a space-based structure, and other suitable types of structures. For example, the different illustrative embodiments may also be used in other vehicles, such as automobiles, surface ships, submarines, spacecraft, trains, personnel carrier, tanks, and other suitable vehicles. Further, one or more illustrative embodiments may also be used with machinery, buildings, homes, space stations, satellites, power plants, bridges, dams, manufacturing facilities, and other suitable locations. For example, an illustrative embodiment may be used in walls, ceilings, and other components of an office or home that may be close to noise sources, such as an airport, a manufacturing facility, or some other noise source.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a composite panel having:
   a first face sheet,
   a second face sheet,
   a core located between the first face sheet and the second face sheet; and
   a number of elongate members, the number of elongate members having a mass with a configuration to reduce a speed of waves propagating in the composite panel such that noise radiating from the composite panel is reduced, the number of elongate members not integrally formed with the first face sheet, the number of elongate members attached individually to an outer surface of the first face sheet, the outer surface of the first face sheet positioned opposite the core and forming an outer surface of the composite panel.

2. The apparatus of claim 1, wherein the number of elongate members is a first number of elongate members and further comprising:
   a second number elongate members associated with the second face sheet.

3. The apparatus of claim 2, wherein the second number of elongate members are positioned on an outer surface of the second face sheet.

4. The apparatus of claim 1, wherein the number of elongate members extends from a first side of the composite panel to a second side of the composite panel.

5. The apparatus of claim 1, wherein the number of elongate members are substantially evenly spaced from each other and extend substantially parallel to each other.

6. The apparatus of claim 1, wherein the composite panel is disposed in one of a wall, a ceiling, or a floor, of an aircraft.

7. The apparatus of claim 1, wherein the number of elongate members are substantially insensitive to temperature.

8. The apparatus of claim 1, wherein the core comprises a honeycomb.

9. the apparatus of claim 1, wherein the elongate members comprise a number of patches.

10. The apparatus of claim 1, wherein the elongate members comprise a cross sectional shape selected from one of square, rectangular, trapezoidal, oval and circular.

11. A method for reducing noise radiation from a composite panel, the method comprising:
   causing waves to propagate through the composite panel comprising a first face sheet, a second face sheet, and a core located between the first face sheet and the second face sheet; and
   reducing a speed of the waves propagating through the composite panel with a number of elongate members associated with the first face sheet, wherein the number of elongate members has a mass with a configuration to reduce the speed of the waves propagating in the composite panel such that the noise radiating from the composite panel is reduced, the number of elongate members not integrally formed with the first face sheet, the number of elongate members attached individually to an outer surface of the first face sheet, the outer surface of the first face sheet positioned opposite the core and forming and outer surface of the composite panel.

12. The method of claim 11 further comprising installing the composite panel in an aircraft.

13. The method of claim 12 further comprising installing the composite panel in one of a wall, a ceiling, or a floor, of an aircraft.

14. The method of claim 11, wherein the number of elongate members extends from a first side of the composite panel to a second side of the composite panel.

15. The method of claim 11 further comprising reducing the speed of a shear wave through the composite panel.

16. The method of claim 11, wherein the core comprises a honeycomb.

17. The method of claim 11, wherein the elongate members comprise a number of patches.

18. The method of claim 11 wherein the elongate members comprise a cross sectional shape selected from one of square, rectangular, trapezoidal, oval, and circular.

19. The method of claim 11, wherein the core comprises a material selected from one of paper, plastic, foam, a meta aramid material, and a para aramid material.

* * * * *